Dec. 24, 1935.  T. L. LINGG  2,025,519
GOLFER'S STANCE GAUGE
Filed Oct. 3, 1933  2 Sheets-Sheet 1
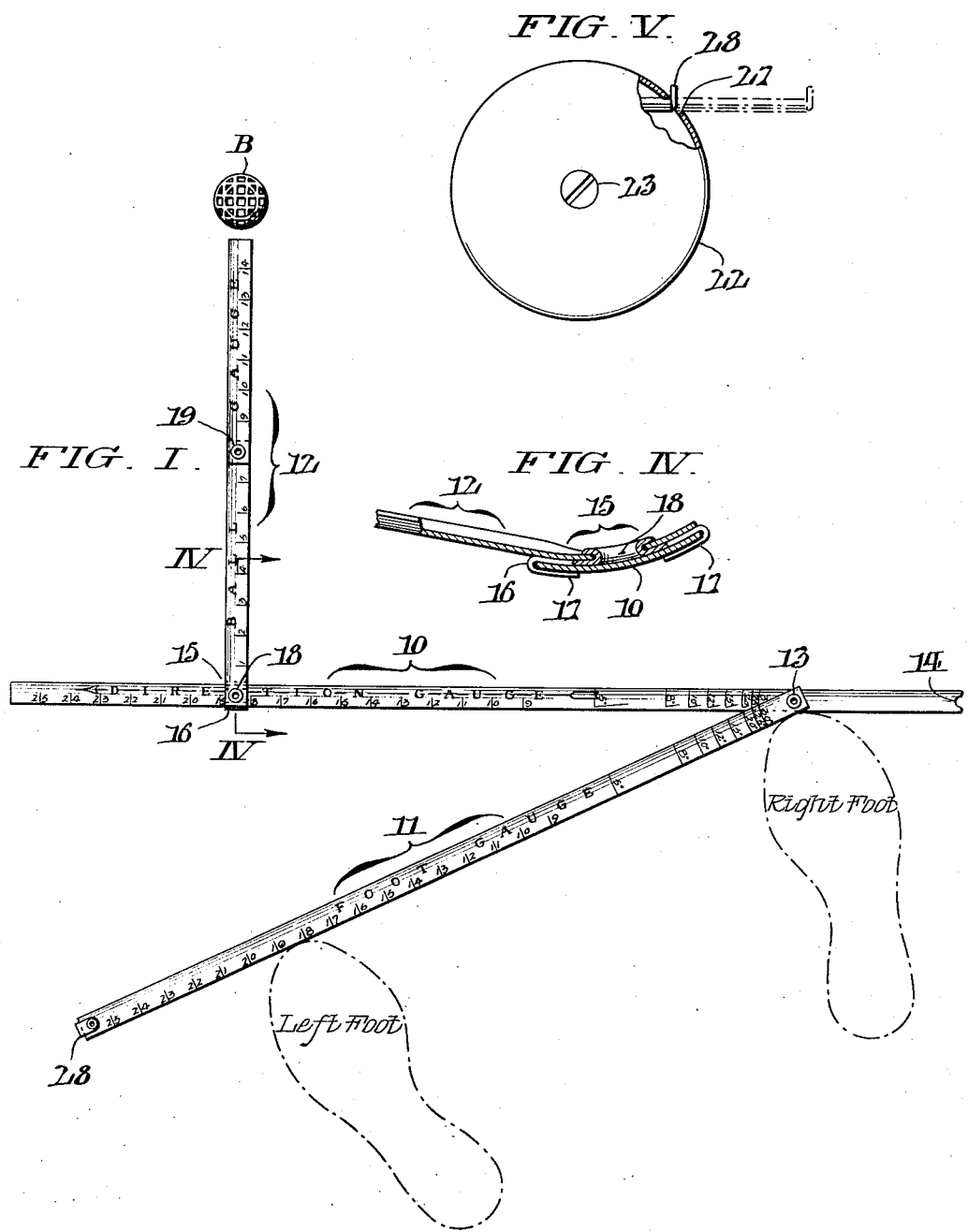
WITNESSES:
INVENTOR:
Timothy L. Lingg,
BY
ATTORNEYS.

Dec. 24, 1935.　　　T. L. LINGG　　　2,025,519
GOLFER'S STANCE GAUGE
Filed Oct. 3, 1933　　　2 Sheets-Sheet 2
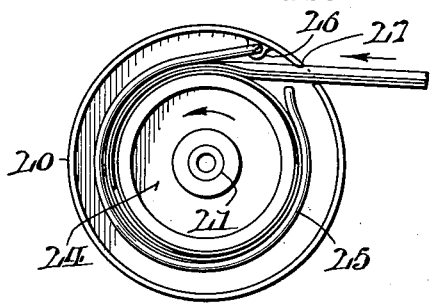
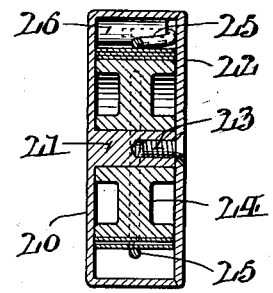
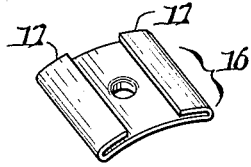
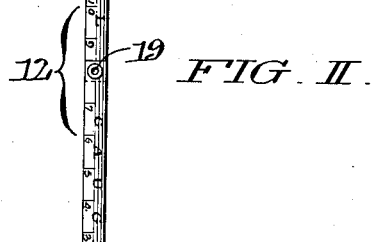
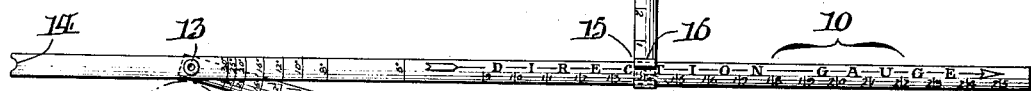
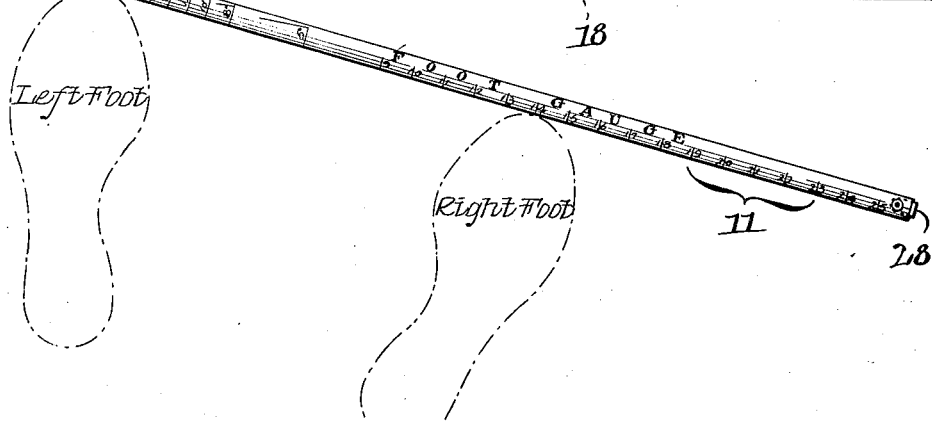
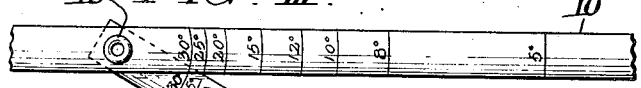
WITNESSES:
John C. Bryner
John A. Weidler
INVENTOR:
Timothy L. Lingg,
BY Fraley Paul
ATTORNEYS.

Patented Dec. 24, 1935

2,025,519

UNITED STATES PATENT OFFICE 2,025,519

GOLFER'S STANCE GAUGE

Timothy L. Lingg, Brookline, Pa.

Application October 3, 1933, Serial No. 691,905

7 Claims. (Cl. 33—174)

The present application is in part a continuation of a previous patent application Serial No. 653,938, filed by me on January 28, 1933.

This invention relates to stance gauges useful more particularly to golf players as an aid in acquiring the proper poise for efficiency in making different kinds of drives incident to playing the game.

Considered from the broadest aspect, my invention is directed to a device of the type referred to which is suitable for self-instruction in accordance with predescribed rules or for instruction under the tutelage of a golf expert, and which can be set to accurately determine different open and closed stances either straight or angular with regard to the intended direction of projection of the golf ball, as well as to accurately determine different positions of the ball laterally as well as longitudinally with respect to the intended line of drive.

Another object of my invention is to secure the above advantages in a stance gauge which lends itself to economic construction from straight cross sectionally rounded flexible tape metal with its component parts swivelly interconnected in such a manner as to be collapsed into mutual coincidence somewhat after the manner of a folding rule.

A further object of my invention is to provide a case for the gauge which can be conveniently carried about in a garment pocket and within which the gauge is collected as a compact spiral incident to being advanced endwise through a receiving slot in the edge wall of said casing.

Still other objects and attendant advantages of this invention will be manifest from the following detailed description of the accompanying drawings, wherein Fig. I is a view showing how my improved gauge is used for an open stance by a right handed player.

Fig. II is a view like Fig. I with the gauge inverted for an open stance by a left handed player.

Fig. III is a fragmentary view on a larger scale showing more clearly the pivoted juncture between the foot and direction gauge component of the gauge and coordinative markings on said components for determining different angles of separation.

Fig. IV is a detail sectional view likewise on a larger scale taken as indicated by the arrow IV—IV in Fig. I showing the sliding swivel connection between the ball gauge component and the direction gauge component of the gauge.

Fig. V shows the novel carrying case which I have devised for the gauge.

Fig. VI is a view of the case with its cover removed for exposure of its interior.

Fig. VII shows the carrying case in axial section; and,

Fig. VIII is a perspective view of a clip embodied in the sliding swivel connection shown in Fig. IV.

With more specific reference first to Figs. I and II of the drawings, my improved stance gauge comprises a direction gauge component 10, a foot gauge component 11, and a ball gauge component 12 all of which are made from straight flexible strip material of concaved cross section, for example, tape steel of a good quality which will withstand bending and rough usage generally without fracturing or kinking. The direction, foot and ball gauge components 10, 11 and 12 are preferably designated as such by lettering on opposite sides as shown in Figs. I and II, and, in addition, the direction gauge component 10 bears arrows on its opposite sides to indicate the direction in which the ball B is to be driven.

The foot gauge component 11, it will be noted, is swivelly connected to the direction gauge component 10 somewhat inward of one end of the latter, by means of a tubular rivet 13 so that it can be swung to different angles relative to said direction component. To facilitate setting of the foot gauge component 11 accurately to any desired angle, it and the direction gauge component 10 are provided on opposite sides with curved crosswise graduations which are concentric with the swivel center 13 and individually numbered to indicate the angles. The graduations on that side of the direction gauge component 10 exposed in Figs. I are moreover characterized by straight segments radially of the pivot center. Thus, for instance, if the foot gauge component 11 is to be set at an angle of five degrees, it is swung upward about the center 13 from the position of Fig. I until its upper edge at the five degree graduation thereon coincides with the radial segment of the five degree graduation on the direction gauge component 10. A similar procedure is followed to set the foot gauge to the other angles indicated by the graduations. On the opposite side of the gauge, see Figs. II and III, the crosswise graduations of the foot gauge 11 have radial segments which are adapted to be brought into coincidence with the lower edge of the direction gauge component 10 when the device is used inverted as in Fig. II. Beyond the five degree angle graduations, both the direction and foot gauge components 10 and 11 are marked off on opposite sides in inches measured from the swivel center 13 and beginning at nine inches and terminating at twenty-five inches. The portion of the direction gauge component 10 extending rightward of the swivel rivet 13 in Fig. I and leftward of said rivet in Fig. II is left plain, i. e., without markings of any knid, but its end is notched centrally as at 14 for a purpose later on explained.

The ball gauge component 12 is attached to the direction gauge component 10 by a sliding swivel connection which is comprehensively indicated by the numeral 15. As shown in Figs. IV and VIII, this connection 15 includes a slide clip 16 which is fashioned from sheet metal to conform with the cross sectional configuration of the direction gauge component 10 and formed with lap flanges 17 for retainment by the edges of said directional gauge component. The slide clip 16 moreover has a central aperture for a tubular rivet 18 which serves as a swivel fulcrum for the ball gauge component 12. This arrangement obviously permits the ball gauge component 12 to be swung outward at right angles to the direction gauge component 10, as well as to be shifted therealong to different distances from the swivel center 13 in accordance with the inch graduations on said direction gauge as desired or required. The ball gauge component 12 is marked off in inches on its opposite sides measured from the swivel center 18, it being in this instance fifteen inches long and made in two sections which are swivelly connected by a rivet 19 at the eight inch graduation. The full length of the ball gauge component 12 is used for making long shots as later on more fully explained. For short shots the upper or shorter section of the ball gauge component 12 is swung under the longer section in Fig. I.

The manner in which the stance gauge is to be used is as follows:

Right hand player

If an open stance is to be used, the gauge is laid as shown in Fig. I with the direction gauge component 10 aligned in the direction of the intended projection of the ball, the foot gauge component 11, opened to a prescribed number of degrees, the ball gauge component 12 extended into perpendicular relation to the direction gauge component and set therealong to the desired distance from the swivel center 13, and the ball B placed at the desired distance from the direction gauge. The player thereupon takes his position to make the shot, placing his right foot at the swivel 13 and his left foot at the desired distance along the foot gauge component 11 as illustrated. If a square stance is used, the foot gauge component 11 is swung over the direction gauge component 10, the right foot placed as before, and the left foot placed at the desired distance from the right foot and toeing said foot gauge component. If a closed stance is used the instrument is inverted, the left foot placed at the swivel juncture 13 and the right foot placed at a described distance along the foot gauge component 11 after the latter is opened a prescribed number of degrees.

Left hand player

If an open stance is used, the gauge is inverted as in Fig. II and the preparations made in the same way as described in connection with Fig. I, except that the player places his left foot at the swivel center 13 and his right foot a prescribed distance along the foot gauge component 11. For a closed stance, the gauge is not inverted, and the right foot placed at the swivel center 13 while the left foot is placed at a predescribed distance along the foot gauge component 11 after the latter is opened a predescribed number of degrees.

The drive

In making a shot with the driver, the direction gauge component 10 should be pointed directly down the fairway with the foot gauge component 11 closed for a square stance. The toe of the right foot is placed at 13 and the left foot approximately twenty inches on the direction gauge component 10. In this instance the ball B should be played off the ball gauge component 12 which should be at right angles, possibly nineteen inches on the direction gauge component 10. The ball B should of course be placed at a distance from the player most suitable to him.

Iron (mashie) shot

Naturally an open stance is used and should be played as follows: The right foot is placed at 13 and the foot gauge component 11 opened possibly to about fifteen degrees, and the left foot positioned possibly fifteen inches on the foot gauge component 11. The ball B will be off the direction gauge component 12 which will be set possibly at nine inches on the direction gauge component 10. Here, again, the ball B will be placed at a distance from the player most suitable to him.

My improved stance gauge can obviously be used in making any kind of a golf shot whether it be with a driver, brassie, spoon, or any number iron, down to a putter. Various stances will of course be prescribed for each club whether made by a right hand player or left hand player and whether made with an open or closed stance. The instrument will determine how the player is to stand to make the particular shot. For example, the player may follow a set of positions prescribed by an expert golfer and sold with the instrument, or he may have a professional golfer prescribe a set of positions for him, giving the distance to which the feet are to be spaced, the angular position of the stance, and the position of the ball B to the player. When the player decides that a certain set of positions are productive of good results, it is intended that he should always use the same positions for each particular shot as a consequence of which he will soon attain perfection in making such shot. Thus it will be seen that by consistent practice with my stance gauge, various difficulties experienced by amateurs as well as advanced golf players can be readily overcome.

For convenience of carrying it about, the gauge is folded, that is to say, the direction, foot and ball gauge components 10, 11 and 12 are brought into mutual alignment so that the gauge can be inserted into the specially designed flat circular case which I have illustrated in Figs. V, VI and VII. As shown, this carrying case includes a cup-like main section 20 having an internal axial post 21, and a cover 22 with a centrally threaded stud 23 which engages into the outer end of the post 21 of the main section 20. Freely rotative on the post 21 within the case is a drum 24 which is embraced by a spring loop 25 of stout wire having pivotal anchorage at one of its ends in a lug 26 on the main section 20 of the case. In line with the spacial interval between the free and the anchored ends of the spring loop 25 the case is formed with a circumferential crosswise extending slot 27. With the gauge folded into a single composite strand, the notched end 14 of its component 10 is introduced into the carrying case through the slot 27 in the latter and incidently caused to engage the spring wire loop 25. As the gauge is fed inward the spring loop 25 by coaction with the notched end 14 not only serves to centralize it in the cover 22 but also to guide it around the drum 24, and at the same time compress the superposed strip components which flatten into a compact mass as they accumulate on said drum after a manner which will be obvious from Figs. VI and VII. The case can thus be made to very small dimensions for ready carriage in the pocket. A thumb clip 28 at the free end of the foot gauge component serves both as a stop in cooperation with the slot 27 of the carrying case, and as a means whereby the gauge can be grasped for initiating its removal from said case.

Having thus described my invention, I claim:

1. The combination in a golfer's collapsible stance gauge, made of flexible tape metal, of a play directing component; a foot gauge component pivotally-connected to the play directing component somewhat inward of one end of the latter, said end forming an extension of the play-directing component, said foot gauge component being adapted for angular adjustment relative to the play directing component; a ball gauge component for locating the ball laterally relative to the play directing component and having a swivel-and-slide connection with the latter; and means coactive with the play directing extension, when the parts aforesaid are folded together, to guide their collapse into coiled mutual coincidence.

2. The combination in a golfer's collapsible stance gauge, made of flexible tape metal, of a play directing component; a foot gauge component pivotally-connected to the play directing component somewhat inward of one end of the latter, said end having a notched extremity and forming an extension of the play-directing component, said foot gauge component being adapted for angular adjustment relative to the play directing component; a ball gauge component having a swivel-and-slide connection with the play directing component so as to be swingable perpendicularly relative to the latter as well as movable along the same; and means including a member coactive with the play directing component notch-ended extension, when the parts aforesaid are folded together, to guide their collapse into coiled mutual coincidence.

3. The combination in a golfer's collapsible stance gauge, made of flexible tape metal, of a play directing component; a foot gauge component pivotally-connected to the play directing component somewhat inward of one end of the latter, said end having a notched extremity and forming an extension of the play-directing component, said foot gauge component being adapted for angular adustment relative to the play directing component; a ball gauge component having a swivel-and-slide connection with the play directing component so as to be swingable perpendicularly relative to the latter as well as slidable along the same; the play directing and foot gauge components being graduated for distances measured from their connecting pivotal center, and the ball gauge component graduated for distances outward from its swivel-and-slide connection with the play directing component; and means including a member coactive with the play directing component notch-ended extension, when the parts aforesaid are folded together, to guide their collapse into coiled mutual coincidence.

4. The combination of claim 3 wherein the swivel-and-slide connection between the ball gauge and play directing components comprises a slide clip with inward flanges adapted to lap the edges of the play directing component, and said clip embodies a tubular projection for passage through a pivot aperture at the inner end of the ball gauge and for outward expansion thereover.

5. The combination of claim 3 wherein the play directing and foot gauge components are provided with corresponding crosswise graduations concentric with their common pivotal center and marked for different angles, and each graduation on one of said components has a radial segment with which one edge of the other component is brought into coincidence for exact determination of a designated angle, whereby the stance gauge is adapted for use by both right and left-hand players.

6. The combination in a golfer's collapsible stance gauge, made of cross-sectionally-rounded flexible tape metal, of a suitably graduated play directing component; a similarly graduated foot gauge component pivotally connected to the play directing component somewhat inward of one end of the latter, said end having a notched extremity and forming an extension of the play-directing component, said foot gauge component being adapted for angular adjustment relative to the play directing component; a ball gauge component having a swivel-and-slide connection with the play directing component; a carrying case having a slot in its periphery with an enclosed freely rotative winding drum, and a spring loop embracing said drum with one end thereof pivoted to the casing, said spring being adapted for coaction with the play directing component notch-ended extension, when the latter is inserted through the carrying case slot, with the play directing foot and and ball components folded together, to guide the collapse of all said components into coiled mutual coincidence.

7. The combination of claim 6 wherein the ball gauge component includes pivoted sections foldable over each other and over the play directing component, the carrying case winding drum embracing spring loop is of round section wire with space between its ends opposite the casing peripheral slot, and one of said ends being pivotally connected to a lug projecting inwardly from the wall of the carrying case.

TIMOTHY L. LINGG.